United States Patent [19]
Brown

[11] Patent Number: 5,916,313
[45] Date of Patent: *Jun. 29, 1999

[54] LOW COST POWER CONVERTER FOR A COMPUTER

[75] Inventor: Alan E. Brown, Georgetown, Tex.

[73] Assignee: Dell U. S. A., L.P., Austin, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/739,660

[22] Filed: Oct. 31, 1996

[51] Int. Cl.$^6$ .................................................. G06F 1/00
[52] U.S. Cl. .......................... 713/300; 713/320; 713/340
[58] Field of Search ............................. 395/750.011, 750, 395/750.03, 750.08; 323/284; 360/663; 363/97, 133, 21, 65; 327/110

[56] References Cited

U.S. PATENT DOCUMENTS

| | | | |
|---|---|---|---|
| 4,425,612 | 1/1984 | Bahler et al. | 363/21 |
| 4,860,185 | 8/1989 | Brewer | 363/41 |
| 5,196,832 | 3/1993 | Griffin | 340/663 |
| 5,230,055 | 7/1993 | Katz et al. | 395/750 |
| 5,355,077 | 10/1994 | Kates | 323/224 |
| 5,406,150 | 4/1995 | Autin | 327/110 |
| 5,430,641 | 7/1995 | Kates | 363/133 |
| 5,479,090 | 12/1995 | Schultz | 323/284 |
| 5,528,127 | 6/1996 | Streit | 323/269 |
| 5,592,675 | 1/1997 | Itoh et al. | 395/750 |
| 5,632,039 | 5/1997 | Walker et al. | 395/750 |
| 5,684,686 | 11/1997 | Reddy | 363/97 |
| 5,715,153 | 2/1998 | Lu | 363/65 |

*Primary Examiner*—Ayaz R. Sheikh
*Assistant Examiner*—Tim Vo
*Attorney, Agent, or Firm*—Haynes and Boone, LLP

[57] ABSTRACT

Method and apparatus for providing a regulated, direct current (DC) output voltage for use in computers. An unregulated voltage source is regulated by a power converter of the present invention that produces the regulated voltage reliably, inexpensively, and without requiring heat sinks or auxiliary fans. In a preferred embodiment, the power converter includes a buck regulator and a control circuit. The control circuit includes a resistor-divider feedback loop connected to the output of the buck regulator in order to provide a feedback voltage. The feedback voltage is supplied to an error amplifier which compares the feedback voltage to an internal reference voltage and produces an output that is the amplified difference between the two voltages. The amplified output is then provided to a frequency modulation (FM) port of a multipurpose timer. As a result, the timer can control and modulate the frequency and pulse width of the buck regulator.

32 Claims, 2 Drawing Sheets

1

LOW COST POWER CONVERTER FOR A COMPUTER

TECHNICAL FIELD

The invention relates generally to computers and more specifically, to a relatively low cost frequency modulating and pulse width modulating power converter for use with computers and the like.

BACKGROUND OF THE INVENTION

A power converter is simply a device that converts energy from an input source to produce a regulated output source of energy. Although there are many types and applications for power converters, one such type is a switching, direct current (DC) to DC, step-down power converter, or "buck" regulator, for use in computers and the like.

FIG. 1 illustrates a conventional non-synchronous buck regulator, designated generally by the reference numeral 10. The buck regulator 10 receives an input voltage $V_{IN}$ and drives an output voltage $V_{OUT}$ and an output current $I_{OUT}$ for use by a load Z, such that $V_{OUT} < V_{IN}$. The buck regulator 10 comprises a switch S1, which is typically a field effect transistor ("FET"), a diode D1, an inductor L1 and a capacitor C1. A control circuit 12 turns the switch "off" and "on", i.e., non-conducting and conducting, respectively, as discussed in greater detail below.

The buck regulator 10 operates on the principle of pulse width modulation to provide "point-of-load" voltage regulation. Point-of-load voltage is the voltage level directly at the load Z. A voltage $V_{D1}$, across the diode D1 is manipulated in such a way that the output voltage $V_{OUT}$ maintains the point-of-load voltage at a regulated voltage level.

The control circuit 12 modulates the switch S1 between "off" and "on" for specific periods, or pulses, of time, referred to as pulse width modulation ("PWM"). In this way, the control circuit 12 controls the duty cycle of the switch S1, and thereby controls the output voltage $V_{OUT}$. Switching regulators such as the buck regulator 10 have conventionally used dedicated PWM chips for the control circuit 12.

Conventional dedicated PWM chips have only moderate performance responses to sharp changes in the point-of-load voltage at the load Z. When the load Z has a sharp transient response, it increases the output current $I_{OUT}$ and thereby causes the output voltage $V_{OUT}$ to sharply fall. As a result, the PWM chip must increase the duty cycle so that it may rapidly pull the output voltage $V_{OUT}$ back to the desired point-of-load voltage level.

The PWM chip increases the duty cycle by increasing the "on" time and decreasing the "off" time of the switch S1, thereby maintaining a fixed frequency. The changes in the duty cycle occur incrementally, i.e., the PWM chip can not make large and instantaneous changes in the duty cycle. The changes in the duty cycle are also restricted by the fixed frequency because the "on" time can not exceed the frequency period. Because of the small change in pulse width, the point-of-load voltage and output voltage $V_{OUT}$ will continue to drop until the regulator has sufficiently increased the duty cycle. As a result, hard and/or soft errors may occur in the load Z, depending on the sensitivity of the load to large swings in the point-of-load voltage.

In addition, dedicated PWM chips are relatively expensive. As a result, one solution has been to use linear regulators. Linear regulators are often fairly inexpensive and very simple, by contrast, to the buck regulator 10. However, linear regulators require substantial heat sinking. Typically, for higher power levels, an extruded heat sink is required, even when used with an auxiliary fan. Thus while the regulators are low in cost and easy to manufacture, they have poor thermal performance. As a result, the cost savings from using a linear regulator are expended on thermal management using a heat sink and/or auxiliary fan.

Therefore, what is needed is a power converter such as a buck regulator with a control circuit that is relatively inexpensive.

Furthermore what is needed is a power converter which does not have the thermal penalties of a conventional linear regulator.

Furthermore what is needed is a power converter such as a buck regulator, with relatively sharp responses to transients in the point-of-load voltage.

SUMMARY OF THE INVENTION

The foregoing problems are solved and a technical advance is achieved by a low cost method and apparatus for providing a regulated, direct current (DC) output voltage for use in computers and the like. An unregulated voltage source is regulated by a power converter of the present invention that produces the regulated voltage reliably, inexpensively, and without requiring heat sinks or auxiliary fans.

In a preferred embodiment, the power converter includes a buck regulator comprising an n-type field effect transistor (FET) switch with the drain connected to the unregulated power source and the source connected to a diode's cathode. The anode of the diode is connected to a ground supply. An inductor is connected between the source of the switch and an output node of the power converter and a capacitor is connected between output node and ground.

The power converter also includes a resistor-divider feedback loop connected to the output node to provide a feedback voltage. The feedback voltage is supplied to a shunt regulator, acting as an error amplifier, which compares the feedback voltage to an internal voltage and produces an output that is the amplified difference between the two voltages. The amplifier output is then provided to a frequency modulation (FM) port of a multipurpose timer. The output of the timer is connected to the gate of the switch, thereby allowing the timer to control and modulate the frequency and pulse width of the switch.

A technical advantage achieved with the invention is that it provides a relatively inexpensive power converter.

Another technical advantage achieved with the invention is that it provides a power converter with sharp responses to transients in the output voltage.

Another technical advantage achieved with the invention is that it provides a power converter that does not have the thermal penalties of a conventional linear regulator.

DESCRIPTION OF THE PREFERRED EMBODIMENT

As mentioned above, FIG. 1 schematically represents a conventional, non-synchronous, direct current ("DC") to DC step down converter commonly referred to as a buck regulator.

Figure 2:
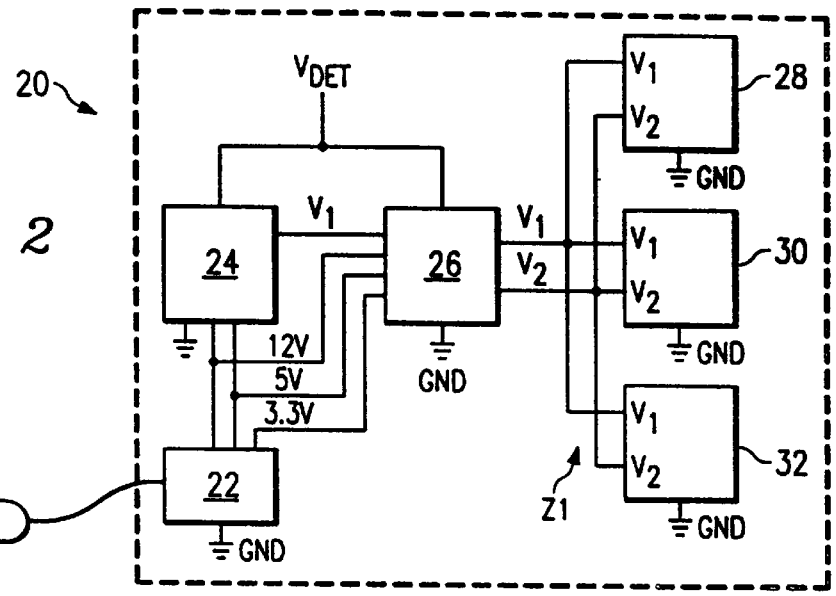
FIG. 2 is a block diagram of a computer system utilizing a power converter and power distribution circuit of the present invention.

Referring to FIG. 2, the reference numeral 20 refers to a personal computer, though it may also refer to a laptop computer, a file server, a mainframe computer, or other electrical device. The computer 20 includes an alternating current ("AC") to DC power converter 22, a DC to DC power converter 24, a power distribution circuit 26, a processing device 28, a memory device 30 and a peripheral device 32. The processing device 28, memory device 30 and peripheral device 32 are representative of a plurality of electronic devices of the computer 20, and are collectively represented as a load Z1.

The AC to DC power converter 22 receives AC power through a power plug 34. Although not shown, the power plug 34 connects to a conventional electrical outlet. However, the power plug 34, as well as the AC to DC power converter 22 may not exist in some applications, such as a laptop computer or other battery driven devices. The AC to DC power converter 22 sources at least three separate DC voltages: a 12V supply, a 5V supply, and a 3.3V supply, as well as a 0V or ground supply GND.

The DC to DC converter 24 and the power distribution circuit 26 receive the DC voltages from the AC to DC power converter 22. The DC to DC converter 24 drives a first voltage V1, which in the present description also represents the point-of-load voltage for the load Z1. The power distribution circuit 26 drives a second voltage V2. The DC to DC converter 24 and the power distribution circuit 26 also receive a dual-power signal $V_{DET}$. The dual-power signal $V_{DET}$ is a conventional signal that allows the DC to DC converter 24 and the power distribution circuit 26 to support different voltage requirements of the computer 20. In the preferred embodiment, if the load Z1 requires two separate voltages V1, V2, such that V1≠V2, then the level of the dual-power signal $V_{DET}$ is set "low." If, however, the load Z1 requires a single voltage V1, V2, such that V1=V2, then the dual-power signal $V_{DET}$ is set "high."

Figure 3:
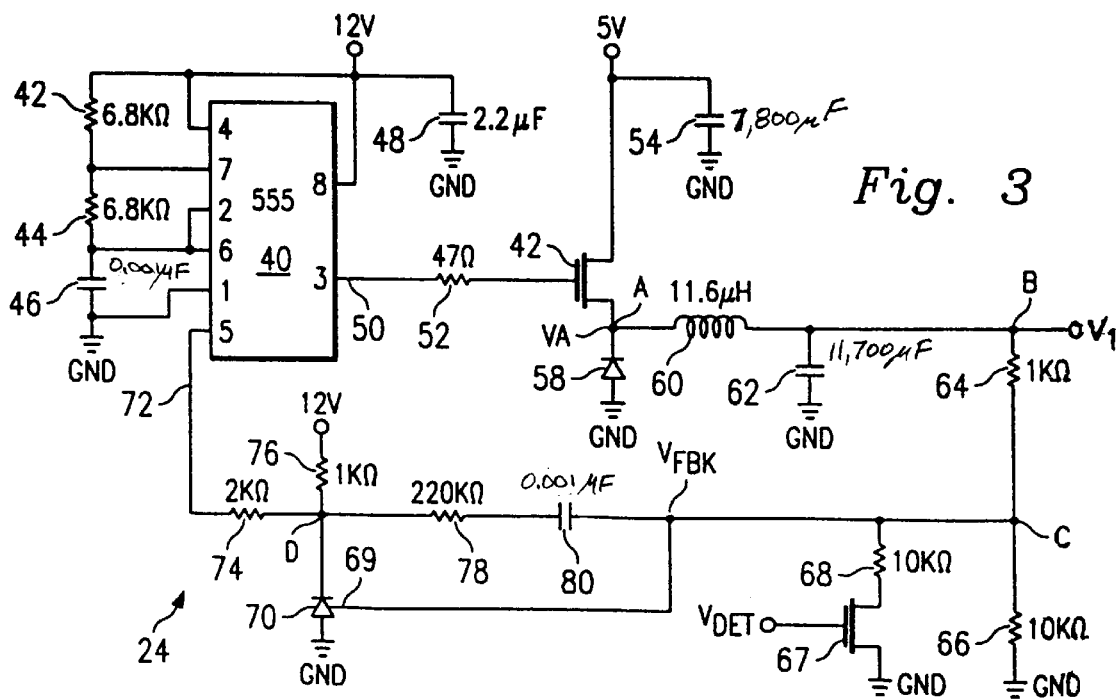
FIG. 3 is a schematic diagram of the power converter of FIG. 2.

Referring to FIG. 3, the DC to DC power converter 24 uses a multipurpose timer 40 to control a switch 42. In the preferred embodiment, the switch 42 is a field effect transistor ("FET") and the multipurpose timer 40 is a conventional "555" timer, such as the LM555 timer manufactured by National Semiconductor Company of Santa Clara, Calif. The pin numbers 1–8 shown on the timer chip 40 also correspond to the LM555. Trigger, reset and threshold levels for the timer chip 40 are configured, as shown, by resistors 42, 44 and capacitors 46 connected between the 12V power supply and ground GND. Such a configuration of the timer 40 is well known by those of ordinary skill in the art and, for the sake of brevity, will not be further discussed.

An output 50 of the timer chip 40 connects to the gate of the FET 42 through an optional resistor 52. The drain of the FET 42 is tied to the 5V power supply, which is decoupled with a capacitor 54. The source of the FET 42 and a cathode of a diode 58 are commonly connected to a node A, wherein a voltage $V_A$ represents the voltage difference between the node A and ground GND. The anode of the diode 58 is connected to ground GND. An inductor 60 is connected between the node A and a node B, wherein the first voltage V1 represents the voltage difference between the node B and ground GND. An output capacitor 62 is also connected between the node B and ground GND.

The first voltage V1 also supports a feedback loop comprising voltage divider resistors 64, 66 connected between the node B and ground GND, thereby producing a feedback voltage $V_{FBK}$ at a node C. The feedback voltage $V_{FBK}$ is also selectively responsive to the dual-power signal $V_{DET}$ and circuit 67. If the dual-power signal $V_{DET}$ is low, the circuit 67 has no effect on the feedback voltage $V_{FBK}$. If the dual-power signal $V_{DET}$ is high, the circuit 67 places a resistor 68 in parallel with the resistor 66, thereby reducing the feedback voltage $V_{FBK}$.

The feedback voltage $V_{FBK}$ is supplied to a voltage input 69 of a shunt regulator 70, which in the preferred embodiment is a TL431 shunt regulator manufactured by National Semiconductor Company of Santa Clara, Calif. The shunt regulator 70 serves as an error amplifier, in that it compares a voltage on the voltage input 69 with an internal voltage, and amplifies the difference accordingly. The shunt regulator 70 used in the present invention has an anode connected to ground GND, a cathode connected to a node D and an internal reference voltage of about 2.5V. The node D connects the shunt regulator cathode to the frequency modulation ("FM") port 72 of the timer 40 through a resistor 74. The node D is also pulled high by a resistor 76 and supports a control loop compensation network comprising a resistor 78 and a capacitor 80 going to the voltage input 69 of the shunt regulator.

Figure 4:
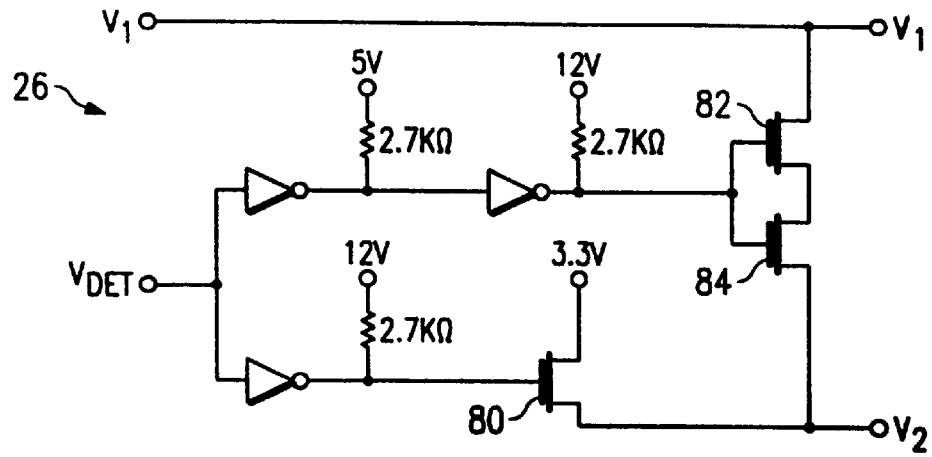
FIG. 4 is a schematic diagram of the power distribution circuit of FIG. 2.

Referring to FIG. 4, the power distribution circuit 26 receives the first voltage V1 and the dual-power signal $V_{DET}$ to produce the second voltage V2. If the dual-power signal $V_{DET}$ is low, a FET 80, which is connected between the 3.3V power supply and the second voltage V2, drives the second voltage V2 to about 3.3V. If the dual-power signal $V_{DET}$ is high, two FETs 82, 84 tie the second voltage V2 to the first voltage V1.

Referring to FIGS. 2–4, in operation, the DC to DC power converter 24 provides a relatively stable point-of-load voltage for the load Z1. The timer 40 drives the output 50 at an initial frequency and duty cycle, as determined by the resistors 42, 44 and the capacitor 46. However, if a change occurs in the point-of-load voltage, such as one caused by a sudden increase in current consumption by the load Z1, the level of the first voltage V1 will drop.

The shunt regulator 70 works to compensate for the drop in the first voltage V1 by comparing the feedback voltage $V_{FBK}$ with an internal feedback voltage and amplifying the difference therebetween. Whenever the first voltage V1 drops, the feedback voltage $V_{FBK}$ also drops. Therefore, as the feedback voltage $V_{FBK}$ changes, the shunt regulator 70 output at node D changes at an amplified rate.

The shunt regulator 70 controls the FM port 72 of the timer 40. Because the shunt regulator 70 provides a fast and broad range of change in the voltage level of node D, both the frequency and the pulse width of the timer output 50 are modulated. In response, the "on" time, or pulse width, of the FET 42 can be increased past the original frequency period of the FET. By modulating both the pulse width and frequency, the combination of both the shunt regulator 70 and timer 40 cause the output voltage $V_{OUT}$ to quickly regain the original point-of-load voltage level.

Figure 1:
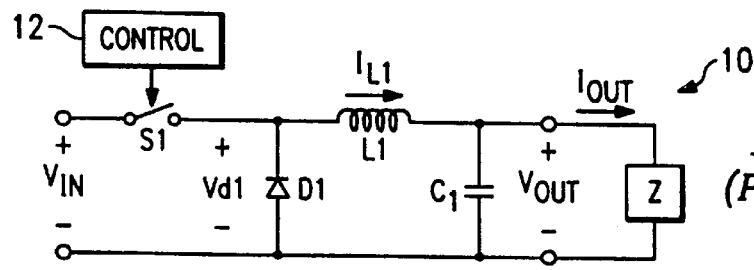
FIG. 1 is a schematic of a prior art, non-synchronous buck voltage regulator.
Figure 5:
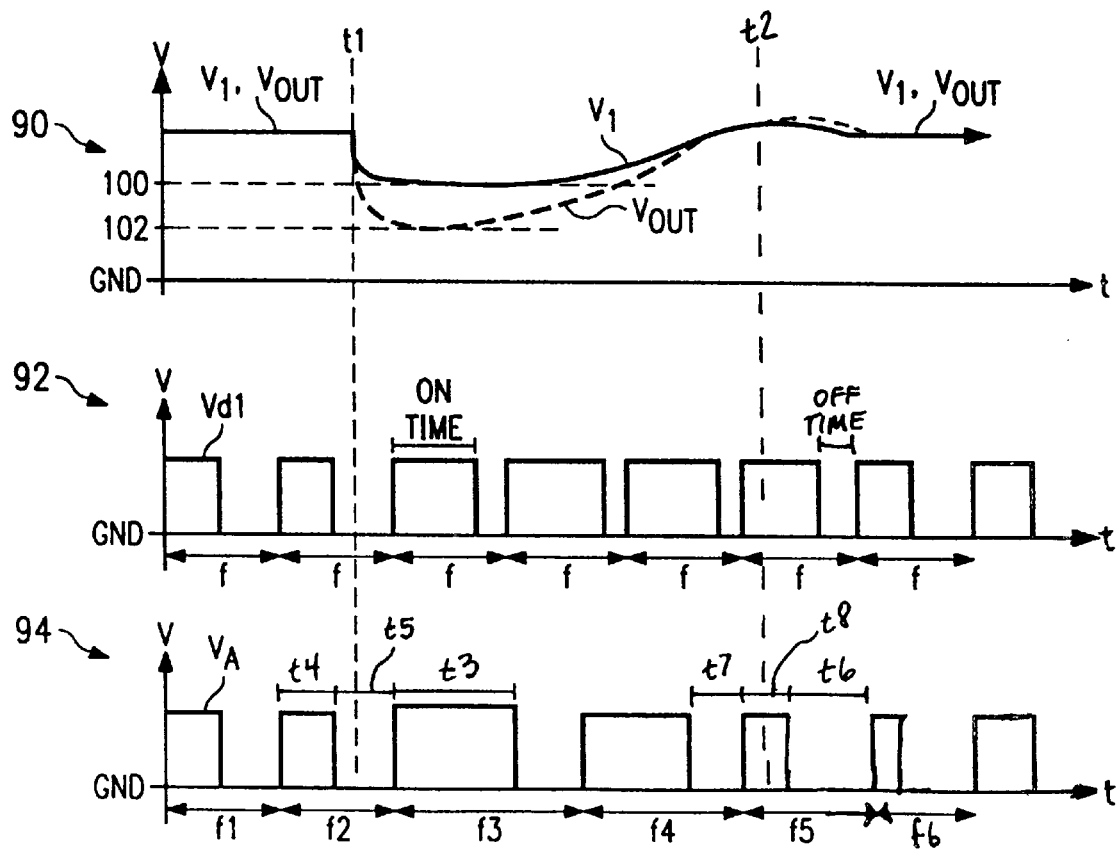
FIG. 5 shows voltage waveforms illustrating the operation of the power converter of FIG. 2, as compared to the operation of the non-synchronous buck voltage regulator of FIG. 1.

Referring also to FIGS. 1 and 5, the performance of the present invention is dramatically improved over that of the prior art buck regulator 10 of FIG. 1, as shown by three graphs 90, 92, and 94. For example, if at a time t1 the load Z1 begins to consume a great deal of current, the first voltage V1 of the present invention only drops to a voltage level 100. However, in the prior art buck regulator 10, the output voltage $V_{OUT}$ drops to a lower voltage level 102. In addition, at a time t2 when the point-of-load voltage reaches its desired voltage level, the output voltage $V_{OUT}$ overshoots the desired voltage level, as compared to the first voltage V1 of the present invention. The improved performance of the present invention is due to the responsiveness of the timer 40, with respect to the shunt regulator 70, over that of the conventional control circuit 12.

The graph 92 illustrates the switching performance of the switch S1 of the prior art buck regulator 10. The control circuit 12 is limited to the fixed frequency $f$ as well as small incremental changes in pulse width "on" time of the voltage $V_{D1}$. As a result, at the time t1, the pulse width "on time" of the switch S1 is only slightly increased, and can never exceed the length of the frequency period. As a result, the output voltage $V_{OUT}$ drops to the voltage level 102. In addition, at the time t2, the pulse width "off time" of the switch S1 is only slightly decreased, so that the output voltage $V_{OUT}$ rises above the voltage level 102.

The graph 94 illustrates the performance of the DC to DC power converter 24 of the present invention. The timer 40 is not limited to a fixed frequency, but supports frequency modulation such as f1, f2, f3, f4, f5, f6 wherein f1≠f2, f2≠f3, f3≠f4, f4≠f5, and f5≠f6. Not being bound to a fixed frequency, the "on time" of the voltage $V_A$ is capable of relatively large incremental changes. For example, an on-time t3 of the voltage $V_A$ immediately after the time t1 is greater than both the on-time t4 and off-time t5 immediately preceding the time t1. Likewise, an off-time t6 immediately after the time t2 is greater than both the off-time t7 and the on-time t8 immediately preceding the time t2. As a result, the present invention provides a voltage regulator that is more responsive to changes in the point-of-load voltage, thereby allowing the first voltage V1 to only drop to the voltage level 100 and to only rise slightly above the desired voltage level.

In summary, the DC to DC power converter 24 of the present invention provides a more reliable point-of-load voltage for the load Z1 than that of the prior art. Furthermore, because the timer 40 and the shunt regulator 70 have a combined cost of about one-fifth that of the dedicated control chip of the prior art, the present invention is relatively inexpensive. Finally, the present invention does not have the thermal considerations of a linear regulator, and therefore does not require a heat sink and/or auxiliary fan.

Although an illustrative embodiment of the invention has been shown and described, other modifications, changes, and substitutions are intended in the foregoing disclosure. In addition, portions of the preferred embodiment, such as circuits and components associated with the dual-power signal $V_{DET}$ and the second voltage V2, can be removed or modified, while still utilizing the present invention. Accordingly, it is appropriate that the appended claims be construed broadly and in a manner consistent with the scope of the invention.

What is claimed is:

1. A computer system comprising:

a processor;

an information bus coupled to the processor;

a memory coupled to the processor by the information bus;

a power supply coupled to the processor and memory for supplying power thereto, the power supply comprising;

an asynchronously switched power FET coupled to a DC input voltage source and to the power supply output, the power supply output being subjected to increases and decreases in load;

an error amplifier coupled to the power supply output for generating an error signal in response to variations in voltage at the power supply output;

a timer including a control input coupled to the error amplifier to receive the error signal therefrom, the timer generating a timing signal having a variable on-time to produce a variable frequency and a variable off-time, the timing signal being supplied to the power FET to control pulse width modulation thereof, the on-time of the timing signal after an increase in load being larger than the off-time of the timing signal prior to the increase in load, the off-time of the timing signal after a decrease in load being larger than the on-time of the timing signal prior to the decrease in load.

2. A power supply comprising:

an asynchronously switched power FET coupled to a DC input voltage source and to a power supply output, the power supply output being subjected to increases and decreases in load;

an error amplifier coupled to the power supply output for generating an error signal in response to variations in voltage at the power supply output; and a timer including a control input coupled to the error amplifier to receive the error signal therefrom, the timer generating a timing signal having a variable on-time to produce a variable frequency and a variable off-time, the timing signal being supplied to the power FET to control pulse width modulation thereof, the on-time of the timing signal after an increase in load being larger than the off-time of the timing signal prior to the increase in load, the off-time of the timing signal after a decrease in load being larger than the on-time of the timing signal prior to the decrease in load.

3. The power supply of claim 2 wherein:

the on-time of the timing signal after an increase in load being larger than the off-time plus the on-time of the timing signal prior to the increase in load, the off-time of the timing signal after a decrease in load being larger than the off-time plus the on-time of the timing signal prior to the decrease in load.

4. A computer comprising an unregulated voltage source, a load, and a power converter for supplying a regulated voltage source at an output node for use by the load, the power converter comprising:

a switch with a first terminal connected to the unregulated power source;

a diode with the cathode of the diode connected to a second terminal of the switch;

an inductor connected between the cathode of the diode and the output node;

a capacitor with the first capacitor terminal connected to the output node and the second capacitor terminal connected to the anode of the diode;

a feedback loop connected to the output node to provide a feedback voltage;

a shunt regulator with a voltage input for receiving the feedback voltage; and a multipurpose timer for controlling the operation of the switch, the timer having a frequency modulation input connected to the cathode of the shunt regulator; the timer generating a timing signal having a variable on-time and a variable off-time to produce a variable frequency, the timing signal being supplied to the switch to control pulse width modulation thereof.

5. The computer of claim 4 wherein, the switch is a field effect transistor ("FET"), such that the first switch terminal is the FET drain, the second switch terminal is the FET source, and the timer controls the switch by controlling the FET gate.

6. The computer of claim 4 wherein the multipurpose timer is a 555 timer.

7. The computer of claim 4 wherein the output node is a point-of-load voltage source for the load.

8. The computer of claim 4 further comprising a ground voltage supply and wherein the anode of the diode, the anode of the shunt regulator, and the second capacitor terminal are commonly connected to the ground voltage supply.

9. The computer of claim 4 wherein the multipurpose timer controls the operation of the switch by turning the switch on and off at a frequency.

10. The computer of claim 4 wherein the multipurpose timer controls the operation of the switch by turning the switch on for a first pulse width and off for a second pulse width.

11. The computer of claim 4 wherein the multipurpose timer controls the operation of the switch by turning the switch on and off at a frequency, the switch being on for a first pulse width and off for a second pulse width, and wherein, in response to a change in the feedback voltage, the shunt regulator causes the multipurpose timer to modulate the frequency, the first pulse width and the second pulse width.

12. The computer of claim 6 wherein the shunt regulator serves as an error amplifier.

13. The computer of claim 8 wherein the feedback loop comprises a first resistor connected between the output node and a reference node and a second resistor connected between the reference node and the ground voltage supply so that the feedback voltage is determined by the reference node.

14. The computer of claim 9 wherein, in response to a change in the feedback voltage, the shunt regulator causes the multipurpose timer to modulate the frequency.

15. The computer of claim 10 wherein, in response to a change in the feedback voltage, the shunt regulator causes the multipurpose timer to modulate the first pulse width.

16. The computer of claim 12 further comprising a power distribution circuit for selectively driving a second regulated voltage source in response to the dual-voltage detect signal.

17. The computer of claim 13 wherein the feedback loop further comprises a third resistor connected to the reference node and selectively connected to the ground voltage supply, for adjusting the voltage level of the feedback voltage.

18. The computer of claim 17 wherein the feedback loop further comprises a dual-voltage detect signal for selectively connecting the third resistor to the ground voltage supply.

19. In a buck regulator having a switch and an output voltage, a control circuit comprising:

a multipurpose timer for controlling a duty cycle of the switch, the timer having a frequency modulation input, the timer generating a timing signal having a variable on-time and a variable off-time to produce a variable frequency, the timing signal being supplied to the switch to control pulse width modulation thereof;

a feedback loop connected to the output voltage for providing a feedback voltage;

an error amplifier with a voltage input for receiving the feedback voltage and an output for driving the frequency modulation input of the multipurpose timer.

20. The control circuit of claim 19 wherein the switch operates at a pulse width and a frequency and the multipurpose timer controls the switch by modulating the pulse width and the frequency.

21. The control circuit of claim 19 wherein the output voltage represents a point-of-load voltage for a load connected to the buck regulator.

22. The control circuit of claim 19 wherein the feedback loop comprises two series resistors for generating the feedback voltage.

23. The control circuit of claim 19 wherein the error amplifier is a shunt regulator.

24. The control circuit of claim 22 wherein the feedback loop further comprises a third resistor for selectively adjusting the voltage level of the feedback voltage.

25. The control circuit of claim 24 wherein the feedback loop further comprises a dual-voltage detect signal for enabling the third resistor to selectively adjust the voltage level of the feedback voltage.

26. A method for controlling a switch of a buck regulator to produce a regulated output voltage, the method comprising the steps of:

controlling a duty cycle of the switch with a multipurpose timer, the timer having a frequency modulation input, the timer generating a timing signal having a variable on-time and a variable off-time to produce a variable frequency, the timing signal being supplied to the switch to control pulse width modulation thereof;

generating a feedback voltage from the output voltage;

detecting and amplifying a change in the feedback voltage; and adjusting the frequency modulation input of the timer in response to the change in the feedback voltage so that the multipurpose timer can adjust the duty cycle in response to the change in the feedback voltage.

27. The method of claim 26 wherein the switch operates at a pulse width and a frequency and the switch is adjusted by modulating the pulse width and the frequency.

28. The method of claim 26 wherein the output voltage represents a point-of-load voltage for a load connected to the buck regulator.

29. The method of claim 26 wherein the change in the feedback voltage is detected and amplified using a shunt regulator connected to the output voltage by a feedback loop.

30. The method of claim 26 wherein the feedback loop comprises a voltage divider.

31. The method of claim 30 wherein the feedback loop comprises a resistor for selectively adjusting the voltage level of the feedback voltage.

32. The method of claim 30 further comprising the step of:

selectively adjusting the voltage level of the feedback voltage with a resistor.

* * * * *